United States Patent
Umemoto et al.

(10) Patent No.: US 8,189,165 B2
(45) Date of Patent: May 29, 2012

(54) LIQUID-CRYSTALLINE COATING FLUID AND POLARIZING FILM

(75) Inventors: Toru Umemoto, Ibaraki (JP); Toshimasa Nishimori, Ibaraki (JP); Tadayuki Kameyama, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 283 days.

(21) Appl. No.: 12/594,705

(22) PCT Filed: Nov. 18, 2008

(86) PCT No.: PCT/JP2008/070893
§ 371 (c)(1),
(2), (4) Date: Oct. 5, 2009

(87) PCT Pub. No.: WO2009/093373
PCT Pub. Date: Jul. 30, 2009

(65) Prior Publication Data
US 2010/0128216 A1    May 27, 2010

(30) Foreign Application Priority Data

Jan. 24, 2008 (JP) ................................ 2008-013226
May 8, 2008 (JP) ................................ 2008-121896

(51) Int. Cl.
*C09K 19/02* (2006.01)
(52) U.S. Cl. ..... 349/167; 349/185; 349/194; 252/299.6; 252/299.62

(58) Field of Classification Search .................. None
See application file for complete search history.

(56) References Cited

U.S. PATENT DOCUMENTS

| 4,540,742 A | * | 9/1985 | Okamoto | 525/61 |
| 4,940,576 A | * | 7/1990 | Walsh | 424/70.11 |
| 5,408,344 A | * | 4/1995 | Takiguchi et al. | 349/57 |
| 2002/0140882 A1 | * | 10/2002 | Kitagawa et al. | 349/96 |

FOREIGN PATENT DOCUMENTS

| EP | 1881349 A1 | 1/2008 |
| JP | 8-225750 A | 9/1996 |
| JP | 2006-323377 A | 11/2006 |
| JP | 2008-007763 A | 1/2008 |
| JP | 2008-031454 A | 2/2008 |
| JP | 2008-56899 A | 3/2008 |
| WO | 2007/139096 A1 | 12/2007 |
| WO | 2007/145159 A1 | 12/2007 |

OTHER PUBLICATIONS

J. Chudy et al, "Separation of Synthetic Food Dyes Using High-Performance Liquid Chromatography," Journal of Chromatography, Jul. 21, 1978. vol. 154, No. 2.
International Search Report of PCT/JP2008/070893, date of mailing Feb. 3, 2009.

* cited by examiner

*Primary Examiner* — Lucy Chien
(74) *Attorney, Agent, or Firm* — Westerman, Hattori, Daniels & Adrian, LLP (57) ABSTRACT

A liquid-crystalline coating fluid comprises: a lyotropic liquid crystal compound; a vinyl alcohol-based polymer; and a solvent, wherein 0.05 to 1.5 weight parts of vinyl alcohol-based polymer is contained with respect to 100 weight parts of the lyotropic liquid-crystal compound.

3 Claims, 4 Drawing Sheets

LIQUID-CRYSTALLINE COATING FLUID AND POLARIZING FILM

FIELD OF THE INVENTION

The present invention relates to a liquid-crystalline coating fluid and a polarizing film made from it.

BACKGROUND OF THE INVENTION

In a liquid crystal panel, a polarizing plate is used to control optical rotation of light beams that pass through liquid crystals. Conventionally, in such a polarizing plate, a polarizing plate obtained by dying a polymer film, such as a polyvinyl alcohol or the like with iodine or a dichromatic dye and stretching the film in one direction has been widely used. However, there has been a problem that the aforementioned polarizing plate is poor in heat resistance and light resistance depending on the kind of the dye or the polymer film. Moreover, there is a problem that the thickness of the film is relatively great.

In contrast, a method for forming a polarizing film by casting a liquid-crystalline coating fluid containing a lyotropic liquid crystal compound onto a substrate, such as a glass plate or a polymer film and the like to orient the lyotropic liquid crystal compound is known (JP 2006-323377 A). The lyotropic liquid crystal compound forms supramolecular aggregates exhibiting liquid crystallinity in the solution, so that the long axis direction of the supramolecular aggregates is oriented in a flowing direction when flowing after applying shearing stress onto the liquid-crystalline coating fluid containing this. Lyotropic liquid crystal compounds-based polarizing films do not need to be stretched and are easy to have a wider width because of no shrinkage in a width direction by stretching. Further, the lyotropic liquid crystal compounds-based polarizing films are expected to have potential because the thickness can be reduced significantly.

However, the polarizing film obtained by casting a conventional liquid-crystalline coating fluid has a drawback that fine crystals of some ten μm are separated out in the film in a drying process, resulting in an increase in haze value of the polarizing film. Moreover, the orientation degree of the lyotropic liquid crystal compounds becomes lower, so that the dichroic ratio becomes smaller, which has become a problem. Thus, a liquid-crystalline coating fluid which has resolved this problem has been demanded.

It is an object of the present invention in a polarizing film obtained from a liquid-crystalline coating fluid containing a lyotropic liquid crystal compound to provide a liquid-crystalline coating fluid which has resolved the drawbacks of the polarizing film caused by a reduction of dichroic ratio because of an increase in haze value of the polarizing film by the separating of fine crystals in the film and the lowered orientation degree.

SUMMARY OF THE INVENTION

Inventors of the present invention carried out extensive investigations on separating of fine crystals in a liquid-crystalline coating fluid containing a lyotropic liquid crystal compound. As a result, they found out that it was possible to inhibit the separating of the fine crystals by mixing a small amount of vinyl alcohol-based polymer and to obtain a polarizing film having a small haze value and a great dichroic ratio. The mixed content of vinyl alcohol-based polymer is preferably 0.05 to 1.5 weight parts with respect to 100 weight parts of the lyotropic liquid crystal compound.

The gist of the present invention is described as follows:

In a first preferred embodiment, a liquid-crystalline coating fluid according to the present invention comprises: a lyotropic liquid crystal compound; a vinyl alcohol-based polymer; and a solvent, wherein the vinyl alcohol-based polymer of 0.05 to 1.5 weight parts is included with respect to 100 weight parts of the lyotropic liquid crystal compound.

In a second preferred embodiment of the liquid-crystalline coating fluid according to the present invention, the lyotropic liquid crystal compound is represented by the following general formula (1):

[Chemical formula 1]

wherein R is a hydrogen atom, an alkyl group with 1 to 3 carbon atoms, an acetyl group, a benzoyl group or a phenyl group (These groups may have any substituent groups). X is a hydrogen atom, a halogen atom, a nitro group, an amino group, a hydroxyl group, an alkoxy group with 1 to 4 carbon atoms, a sulfonic acid group or a sulfonate group. k is an integer from 0 to 4. l is an integer from 0 to 4 (k+1≦4). m is an integer from 0 to 2, and o is an integer from 0 to 2. At least one of k, l, m, and o is not 0. M represents a counter ion.

In a third preferred embodiment, a polarizing film according to the present invention is obtained by casting the liquid-crystalline coating fluid in a thin film state, followed by drying.

ADVANTAGES OF THE INVENTION

In a polarizing film obtained by casting and drying a liquid-crystalline coating fluid, the separating of fine crystals in the film is inhibited in a drying process to obtain a polarizing film having a small haze value, in which the lyotropic liquid crystal compound has a high orientation degree, resulting in high dichroic ratio.

DESCRIPTION OF THE PREFERRED EMBODIMENTS

[Liquid-crystalline Coating Fluid]

In this specification, "a liquid-crystalline coating fluid" is a fluid exhibiting a liquid crystal phase in a specific temperature range and concentration range. Examples of the aforementioned liquid crystal phase include a nematic liquid crystal phase, a smectic liquid crystal phase, and a hexagonal liquid crystal phase or the like. These liquid crystal phases can be identified and confirmed by observing optical patterns with a polarization microscope.

The liquid-crystalline coating fluid of the present invention comprises: a lyotropic liquid crystal compound; a vinyl alcohol-based polymer; and a solvent. And the content of the vinyl alcohol-based polymer is 0.05 to 1.5 weight parts with respect to 100 weight parts of the lyotropic liquid crystal compound. In the liquid-crystalline coating fluid of the present invention, containing a vinyl alcohol-based polymer makes it possible to obtain a polarizing film having a small haze value and a great dichroic ratio. The haze value is decreased because the vinyl alcohol-based polymer is filled in the clearance of a plurality of supramolecular aggregates of the lyotropic liquid crystal compound that exist in the liquid-crystalline coating fluid to perform hydrogen bonding with the supramolecular aggregates. This inhibits the aggregation of the supramolecular aggregates arises in the process of volatizing the solvent to inhibit the separating of microcrystals. Further, the reason for an increase in dichroic ratio is that the lyotropic liquid crystal compounds become easier to orient in one direction because of the similar mechanism.

The liquid-crystalline coating fluid of the present invention is not particularly limited, if only a lyotropic liquid crystal compound, a vinyl alcohol-based polymer, and a solvent are included, however, the coating fluid may contain any additives. Examples of the additives include a surfactant, an antioxidant, an antistatic agent and the like. The concentration of the additives is generally less than 10 weight parts with respect to 100 weight parts of the lyotropic liquid crystal compound.

[Lyotropic Liquid Crystal Compound]

The lyotropic liquid crystal compound to be used in the present invention is a liquid crystal compound having a property to cause a phase transition of an isotropic phase and a liquid crystal phase according to changes of the temperature and the concentration in a solution state in which the lyotropic liquid crystal compound is dissolved in a solvent. The concentration of the lyotropic liquid crystal compound in the liquid-crystalline coating fluid of the present invention is preferably 0.5 to 50% by weight. The liquid-crystalline coating fluid of the present invention preferably exhibits a liquid crystal phase at least a portion in the concentration range of the lyotropic liquid crystal compound.

The lyotropic liquid crystal compound to be used in the present invention preferably exhibits absorption at any one of wavelengths in a visible light region (at wavelength of 380 to 780 nm). Examples of lyotropic liquid crystal compounds to be used in the present invention preferably include azo-base compounds, anthraquinone-base compounds, perylene-base compounds, quinophthalone-base compounds, naphthoquinonic-base compounds or merocyanine-base compounds.

The lyotropic liquid crystal compound to be used in the present invention is preferably an azo compound represented by the following general formula (1). Such an azo compound exhibits a stable liquid crystal phase in the solution and can obtain a polarizing film having a great dichroic ratio in a wide range within a visible light region (at wavelength of 380 to 780 nm).

[Chemical formula 1]

wherein R is a hydrogen atom, an alkyl group with 1 to 3 carbon atoms, an acetyl group, a benzoyl group or a phenyl group (These groups may have any substituent groups). X is a hydrogen atom, a halogen atom, a nitro group, an amino group, a hydroxyl group, an alkoxy group with 1 to 4 carbon atoms, a sulfonic acid group or a sulfonate group. k is an integer from 0 to 4 ($k+1 \leq 4$). m is an integer from 0 to 2, and o is an integer from 0 to 2. At least one of k, l, m, and o is not 0. M represents a counter ion. The counter ion M is preferably a hydrogen atom, an alkali metal atom, an alkali earth metal atom, a metal ion or a substituted or unsubstituted ammonium ion. Examples of a metal ion include, for instance, $Li^+$, $Ni^{2+}$, $Fe^{3+}$, $Cu^{2+}$, $Ag^+$, $Zn^{2+}$, $Al^{3+}$, $Pd^{2+}$, $Cd^{2+}$, $Co^{2+}$, $Mn^{2+}$, or $Ce^{3+}$ and the like. When the counter ion M is a multivalent ion, a plurality of azo compounds share one multivalent ion (counter ion).

The lyotropic liquid crystal compound to be used in the present invention is further preferably an azo compound represented by the following general formula (2) or (3): In the general formulae (2) and (3), R, X, M are similar to those of the general formula (1). According to an azo compound represented by the general formula (2) or (3), a polarizing film having a particularly great dichroic ratio can be obtained.

[Chemical formula 2]

[Chemical formula 3]

[Vinyl Alcohol-based Polymer]

The vinyl alcohol-based polymer to be used in the present invention is appropriately used in accordance with its purpose. The vinyl alcohol-based polymer to be used in the present invention may be a straight-chain polymer or a branched polymer. Alternatively, the vinyl alcohol-based polymer may be a homopolymer or a copolymer composed of unit monomers of two kinds or more. In the case of a copolymer, its sequence may be either of alternate, random, or block. A typical example of a homopolymer is polyvinyl alcohol and a typical example of a copolymer is an ethylene vinyl alcohol copolymer.

A commercially available one is usable as the aforementioned vinyl alcohol-based polymer. Examples of the commercially available vinyl alcohol-based polymer include Poval Series produced by KURARAY CO., LTD. (product name: "PVA-103", "PVA-117", "PVA-613", "PVA-220", and "PVA-405" or the like), Gohsenol Series produced by Nippon Synthetic Chemical Industry Co., Ltd. (product name: "NH-18", "NH-300", "A-300", "C-500", and "GM-14" or the like), Soarnol Series produced by the same company (product name: "D2908", "DT2903", and "DC3203" or the like).

The mean molecular weight (Mw) of the aforementioned vinyl alcohol-based polymer is not particularly limited, but is preferably 1,000 to 500,000, more preferably 10,000 to 200,000.

[Solvent]

While the solvents to be used in the present invention are not particularly limited, if only the solvents dissolve the aforementioned lyotropic liquid crystal compound and the aforementioned vinyl alcohol-based polymer, hydrophilic solvents are preferably used as the solvent. The aforementioned hydrophilic solvents are preferably water, alcohol kinds, cellsolve kinds and a mixture of thereof. Water-soluble compounds, such as glycerin, ethylene glycol or the like may be added to the solvents. These additives can be used to control readily solubility of the lyotropic liquid crystal compound and the drying rate of the liquid-crystalline coating fluid.

[Polarizing Film]

A polarizing film of the present invention can be obtained by casting the liquid-crystalline coating fluid of the present invention onto the substrate or the surface of a metal drum, followed by drying. The polarizing film of the present invention comprises the aforementioned lyotropic liquid crystal compound, and the aforementioned vinyl alcohol-based polymer. While it is to be understood that flow casting means of a liquid-crystalline coating fluid is not particularly limited, if only the liquid-crystalline coating fluid is uniformly cast. A flow casting means using an appropriate coater, for example, a slide coater, a slot die coater, a bar coater, a rod coater, a roll coater, a curtain coater, and a spray coater or the like is applied. While drying means is not particularly limited, natural drying, reduced-pressure drying, drying by heating, and drying by heating under reduced pressure or the like may be used. Any drying methods using a drying apparatus, such as an air circulation-type drying oven or heated rolls and the like are used as drying by a heating means. The drying temperature in the case of drying by heating is preferably 50 to 120° C.

The polarizing film of the present invention preferably exhibits absorption dichroism in a visible light region (at a wavelength of 380 to 780 nm). The absorption dichroism can be obtained by the orientation of the aforementioned lyotropic liquid crystal compound in the polarizing film. The aforementioned lyotropic liquid crystal compound forms supramolecular aggregates in the liquid-crystalline coating fluid. Accordingly, the long axis direction of the supramolecular aggregates is oriented in a flowing direction by casting the liquid-crystalline coating fluid while applying shearing force to the liquid-crystalline coating fluid to flow. In addition to shearing force, an orientation means may combine orientation treatment, such as rubbing treatment and optical orientation or the like and orientation by a magnetic field and an electric field.

The polarizing film of the present invention preferably has a thickness of 0.1 to 1 μm, more preferably 0.1 to 0.8 μm. A polarizing film having appropriate transmittance (for instance, 30 to 50%) can be obtained within the aforementioned range of thickness.

According to the polarizing film of the present invention, the haze value of the polarizing film can be preferably set at 1.0% or lower. The haze value is preferably as small as 0. Further, according to the polarizing film of the present invention, the dichroic ratio can be set at 21 or greater. It is preferable that the dichotic ratio of the polarizing film is as great as possible.

[Substrate]

While it is to be understood that a substrate for casting the liquid-crystalline coating fluid of the present invention is not particularly limited, a single layer or a plurality of layers, for example, a laminate including an orientation film, may be used. Examples of the specific substrate include a glass plate or a polymer film. When the substrate is a laminate including an orientation film, the orientation film is preferably treated with orientation. Examples of the substrate of the laminate including an orientation film include a substrate made by coating a polyimide film on a glass plate. Orientation property is given to the polyimide film by a known method, for example, by mechanical orientation treatment, such as rubbing or the like and optical orientation treatment or the like. An alkali-free glass to be used for a liquid crystal cell is preferably used as a glass substrate. A polymer film substrate is preferably used for the uses that require flexibility. The surface of the polymer film may be orientation treated by rubbing or the like. Alternatively, an orientation film may be laminated on the surface of the polymer film. While materials of the polymer film used for the substrate are not particularly limited, only if the materials are polymer having film forming properties, examples of the materials include stylene polymers, (meta) acrylic acid polymers, ester polymers, olefin polymers, norbornene polymers, imide polymers, cellulose polymers, vinyl alcohol polymers, and carbonate polymers or the like. Although the thickness of the substrate is not particularly limited except for its application, the thickness is generally in the range between 1 to 1,000 μm.

[Manufacturing Method]

The liquid-crystalline coating fluid of the present invention is prepared by any appropriate methods. For example, the liquid-crystalline coating fluid may be prepared by adding a vinyl alcohol-based polymer to a solution containing a lyotropic liquid crystal compound to be dissolved, alternatively, the liquid-crystalline coating fluid may be prepared by adding a lyotropic liquid crystal compound to the solution containing a vinyl alcohol-based polymer.

[Applications of Polarizing Film]

The polarizing film of the present invention is preferably used as a polarizer. The polarizer is applied to liquid crystal display apparatuses, such as office automation appliances, such as personal computer monitors, laptop computers, copy machines or the like, portable devices, such as mobile phones, watches, digital cameras, Personal Digital Assistance (PDA), portable game devices or the like, home appliances, such as video cameras, television units, and microwave oven or the like, car appliances, such as rear-view mirrors, monitors for car navigation system, and car audio videos or the like, displays, such as monitors for information for stores, and security gizmos, such as supervisory monitors, care giving monitors, and monitors for medical purposes or the like. The polarizing film of the present invention may be used after being released from the substrate or may be used in the state that the polarizing film is laminated on the substrate. When the polarizing film is used for an optical application while the polarizing film is laminated on the substrate, the substrate is preferably transparent to visible light. The polarizing film may be used in the state of being laminated on other support or an optical element when the polarizing film is released from the substrate.

EXAMPLES

The present invention will be more clearly understood by referring to the Examples below. However, the Examples should not be construed to limit the invention in any way.

Example 1

In accordance with a conventional method ("Riron Seizo Senryo Kagaku" Fifth Edition (Theoretical production Dye Chemistry), Yutaka Hosoda (published on Jul. 15, 1968, GIHODO SHUPPAN Co., Ltd.), pages 135 to 152), a monoazo compound was produced by diazotizing and coupling 4-nitroaniline and 8-amino-2-naphthalene sulfonic acid. The obtained monoazo compound was diazotized by a conventional method in the same manner and was further subject to coupling reaction with 7-amino-1-naphthol-3,6-disulfonate lithium salt to obtain a rough product including an azo compound having the following structural formula (4) and salting out was carried out with lithium chloride to obtain an azo compound having the structural formula (4) below. This azo compound is a lyotropic liquid crystal compound.

[Chemical formula 4]

(4)

100 weight parts of the azo compound of the aforementioned structural formula (4) and 0.5 weight part of polyvinyl alcohol having a mean molecular weight (Mw) of 75,000 (produced by KURARAY CO., LTD., product name "PVA-117") were dissolved in ion-exchange water to prepare a liquid-crystalline coating fluid having 20% by weight of a concentration of the azo compound of the aforementioned structural formula (4). The liquid-crystalline coating fluid was obtained with a poly dropper and was sandwiched by two pieces of slide glasses. A nematic liquid crystal phase was observed when observing with a polarization microscope at room temperature (23° C.).

The aforementioned liquid-crystalline coating fluid was cast by flowing onto the surface of a norbornene polymer film (produced by Nippon Zeon Co., Ltd., product name "Zeonor") with rubbing treatment and corona treatment in one direction using a bar coater (produced by BUSCHMAN, product name "Mayerrot HS4") while applying shearing force to obtain a polarizing film with a thickness of 0.4 μm by natural drying in a temperature-controlled room at 23° C. Optical characteristics of the obtained polarizing film are indicated in Table 1.

TABLE 1

|  | Liquid-crystalline coating fluid | | | Polarizing film | |
| --- | --- | --- | --- | --- | --- |
|  | Azo compound | Content of polyvinyl alcohol (weight part) | Liquid crystallinity | Haze value (%) | Dichroic ratio |
| Example 1 | (4) | 0.5 | Yes | 0.5 | 30 |
| Example 2 | (4) | 0.1 | Yes | 0.7 | 21 |
| Example 3 | (4) | 1.0 | Yes | 0.7 | 23 |
| Example 4 | (4) | 0.05 | Yes | 1.0 | 20 |
| Comparative Example 1 | (4) | 0 | Yes | 1.2 | 20 |
| Comparative Example 2 | (4) | 5.0 | No | 4.2 | 3 |
| Example 5 | (5) | 0.5 | Yes | 0.7 | 26 |
| Example 6 | (5) | 0.05 | Yes | 1.2 | 22 |
| Example 7 | (5) | 0.1 | Yes | 1.2 | 22 |
| Example 8 | (5) | 1.0 | Yes | 0.7 | 23 |
| Comparative Example 3 | (5) | 0 | Yes | 2.6 | 19 |
| Comparative Example 4 | (5) | 5.0 | No | 1.2 | 7 |

Example 2

A liquid-crystalline coating fluid was prepared in the same manner as in Example 1 except that the content of polyvinyl alcohol was 0.1 weight part to prepare a polarizing film. Optical characteristics of the obtained polarizing film are shown in Table 1.

Example 3

A liquid-crystalline coating fluid was prepared in the same manner as in Example 1 except that the content of polyvinyl alcohol was 1.0 weight part to prepare a polarizing film. Optical characteristics of the obtained polarizing film are shown in Table 1.

Example 4

A liquid-crystalline coating fluid was prepared in the same manner as in Example 1 except that the content of polyvinyl alcohol was 0.05 weight part to prepare a polarizing film. Optical characteristics of the obtained polarizing film are shown in Table 1.

Example 5

An azo compound of the structural formula (5) was obtained in the same manner as in Example 1 except for using 1-amino-8-naphthol-2,4-disulfonate lithium salt instead of 7-amino-1-naphthol-3,6-disulfonate lithium salt. This azo compound was a lyotropic liquid crystal compound.

[Chemical formula 5]

(5)

100 weight parts of the azo compound of the aforementioned structural formula (5) and 0.5 weight part of polyvinyl alcohol having a mean molecular weight (Mw) of 75,000 (produced by KURARAY CO., LTD., product name "PVA-117") were dissolved in ion-exchange water to prepare a liquid-crystalline coating fluid having 20% by weight of a concentration of the azo compound of the aforementioned structural formula (5). The liquid-crystalline coating fluid was obtained with a poly dropper and was sandwiched by two pieces of slide glasses. A nematic liquid crystal phase was observed when observing with a polarization microscope at room temperature (23° C.).

A polarizing film was prepared in the same manner as in Example 1 except for using the aforementioned liquid-crystalline coating fluid to prepare a polarizing film. Optical characteristics of the obtained polarizing film are shown in Table 1.

Example 6

A liquid-crystalline coating fluid was prepared in the same manner as in Example 5 except that the content of polyvinyl alcohol was 0.05 weight part to prepare a polarizing film. Optical characteristics of the obtained polarizing film are shown in Table 1.

Example 7

A liquid-crystalline coating fluid was prepared in the same manner as in Example 5 except that the content of polyvinyl alcohol was 0.1 weight part to prepare a polarizing film. Optical characteristics of the obtained polarizing film are shown in Table 1.

Example 8

A liquid-crystalline coating fluid was prepared in the same manner as in Example 5 except that the content of polyvinyl alcohol was 1.0 weight part to prepare a polarizing film. Optical characteristics of the obtained polarizing film are shown in Table 1.

Comparative Example 1

A liquid-crystalline coating fluid was prepared in the same manner as in Example 1 except that polyvinyl alcohol was not mixed to prepare a polarizing film. Optical characteristics of the obtained polarizing film are shown in Table 1.

Comparative Example 2

A liquid-crystalline coating fluid was prepared in the same manner as in Example 1 except that the content of polyvinyl alcohol was 5.0 weight parts to prepare a polarizing film. Optical characteristics of the obtained polarizing film are shown in Table 1.

Comparative Example 3

A liquid-crystalline coating fluid was prepared in the same manner as in Example 5 except that polyvinyl alcohol was not mixed to prepare a polarizing film. Optical characteristics of the obtained polarizing film are shown in Table 1.

Comparative Example 4

A liquid-crystalline coating fluid was prepared in the same manner as in Example 5 except that the content of polyvinyl alcohol was 5.0 weight parts to prepare a polarizing film. The liquid-crystalline coating fluid in Comparative Example 4 did not exhibit liquid crystallinity. Optical characteristics of the obtained polarizing film are shown in Table 1.

[Evaluation]

Figure 1:
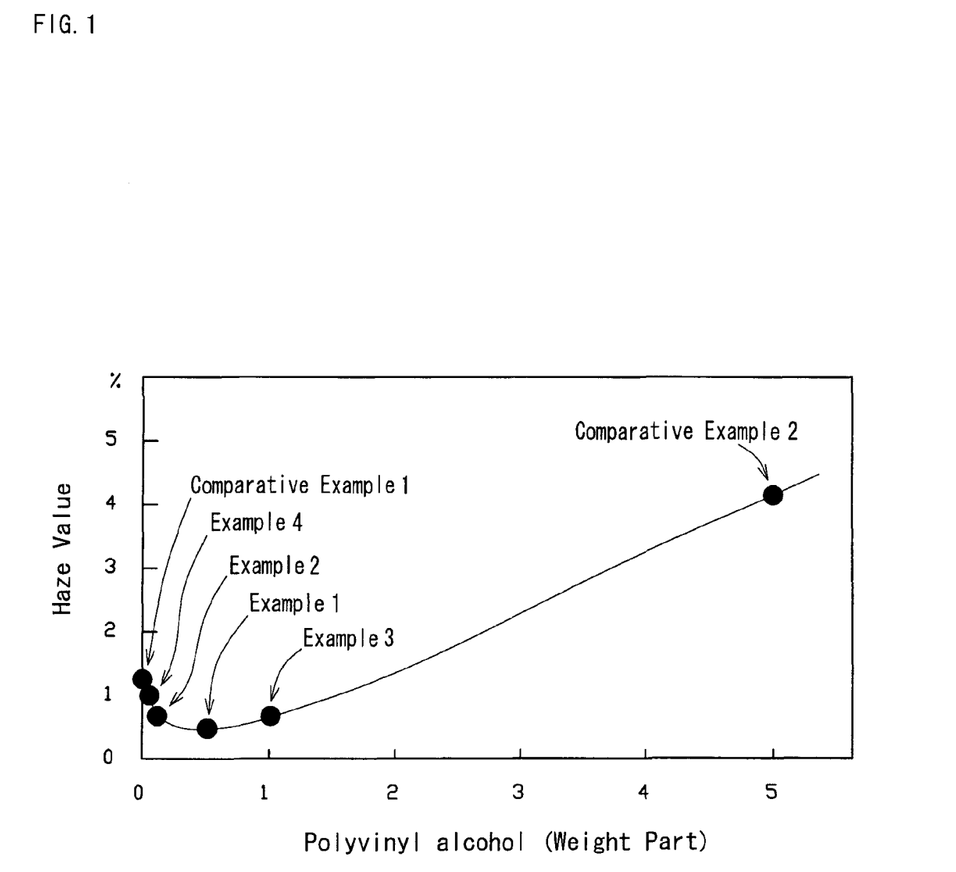
FIG. 1 is a graph showing a relationship between the content of polyvinyl alcohol and the haze value (Structural formula 4).
Figure 2:
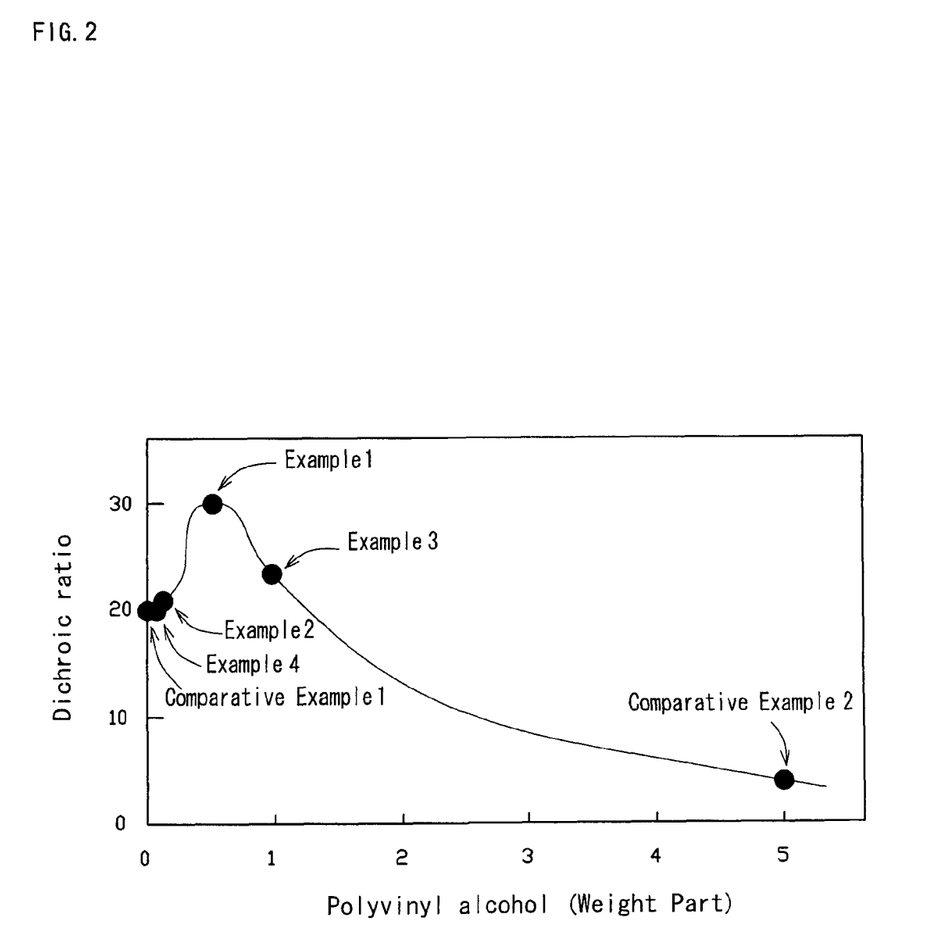
FIG. 2 is a graph showing a relationship between the content of polyvinyl alcohol and the dichroic ratio (Structural formula 4).

(1) When an azo compound of the structural formula (4) is used, in FIG. 1, the haze value is at a minimum when the content of polyvinyl alcohol is 0.5% by weight. An effect of containing polyvinyl alcohol can be obtained in the range that its content is 0.05 to 1.5 weight parts. In this range, the liquid-crystalline coating fluid containing polyvinyl alcohol has a smaller haze value than the one that does not contain polyvinyl alcohol. Further, in FIG. 2, a polarizing film has a maximum dichroic ratio when the content of polyvinyl alcohol is 0.5 weight part. Moreover, an effect of containing polyvinyl alcohol can be obtained when the content of polyvinyl alcohol is in the range of 0.1 to 1.2 weight parts. In this range, the liquid-crystalline coating fluid containing polyvinyl alcohol has a greater dichroic ratio than the one that does not contain polyvinyl alcohol.

Figure 3:
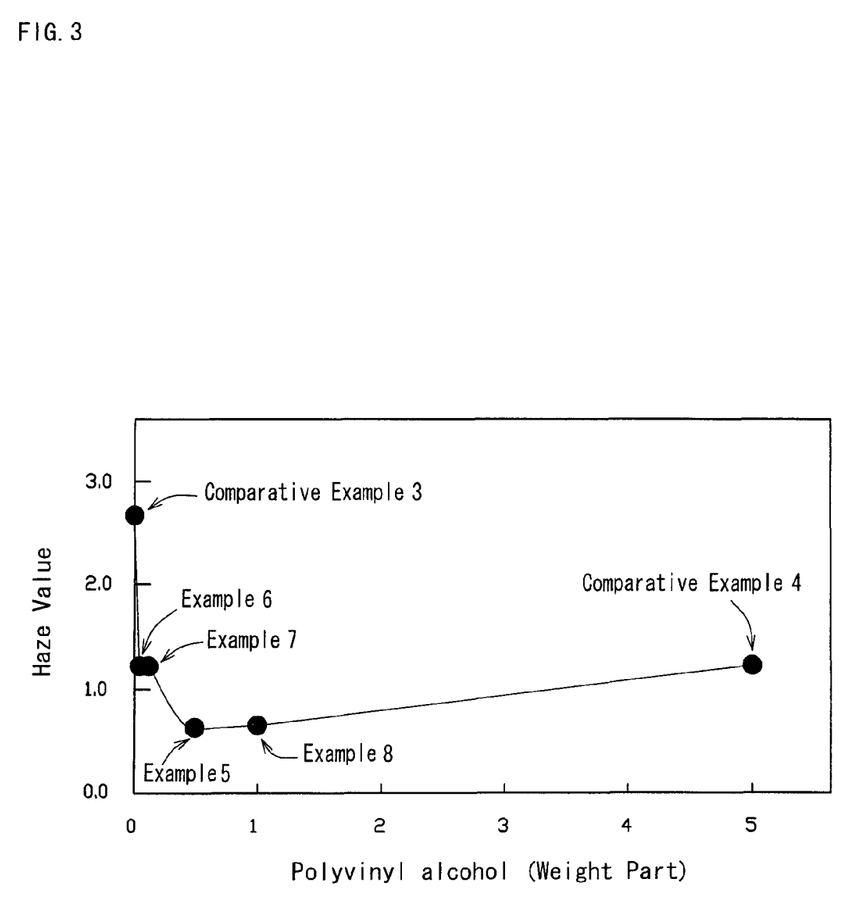
FIG. 3 is a graph showing a relationship between the content of polyvinyl alcohol and the haze value (Structural formula 5).
Figure 4:
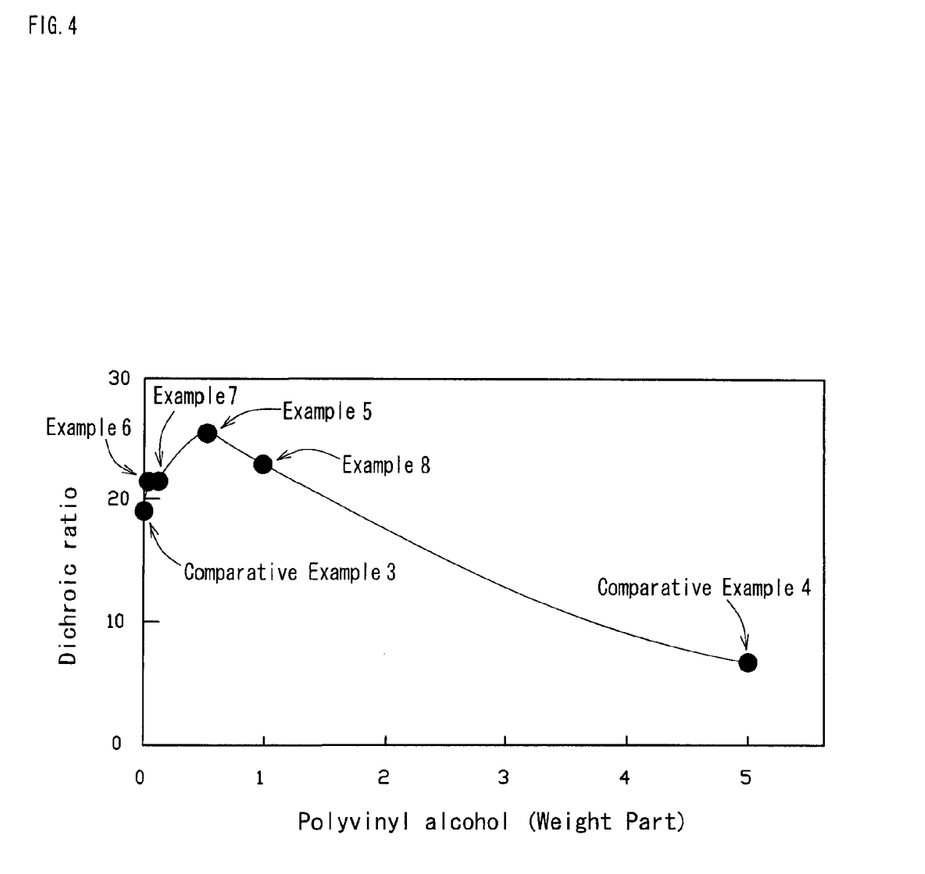
FIG. 4 is a graph showing a relationship between the content of polyvinyl alcohol and the dichroic ratio (Structural formula 5).

(2) When an azo compound of the structural formula (5) is used, in FIG. 3, the polarizing film has a minimum haze value when the content of polyvinyl alcohol is 0.5 weight part. Further, an effect of containing polyvinyl alcohol can be obtained when the content of polyvinyl alcohol is in the range of 0.05 to 5 weight parts (Although experiments were carried out up to 5 parts weight, there appeared to be an effect of decreasing the haze value, even if the content of polyvinyl alcohol is over 5 weight parts). In this range, the liquid-crystalline coating fluid containing polyvinyl alcohol has a smaller haze value than the one that does not contain polyvinyl alcohol. Furthermore, in FIG. 4, the polarizing film has a maximum dichroic ratio when the content of polyvinyl alcohol is 0.5 weight part. The effect of the content of polyvinyl alcohol can be obtained when the content is 0.05 to 2 weight parts and in this range, the polarizing film has a greater dichroic ratio than the liquid-crystalline coating fluid that does not contain polyvinyl alcohol.

(3) Compared to the azo compound of the structural formula (5), the azo compound of the structural formula (4) is excellent in minimum haze value and maximum dichroic ratio when the content of the polyvinyl alcohol is an optimum value. However, when the liquid-crystalline coating fluid has an excess content of polyvinyl alcohol, the haze value and dichroic ratio of the polarizing film are significantly deteriorated.

[Measurement Method]

[Observation of Liquid Crystal Phase]

A liquid-crystalline coating fluid was obtained using a poly dropper and was sandwiched by two pieces of slide glasses (produced by Matsunami Glass Ind. Ltd., product name:

"MATSUNAMI SLIDE GLASS") to observe using a polarization microscope (manufactured by Olympus, product name: "OPTIPHOT-POL").

[Measurement of Thickness of a Polarizing Film]

A portion of a polarizing film was released to obtain the thickness of the polarizing film by measuring the level difference using a three-dimensional measurement system of the shape of a non-contact surface (manufactured by Ryoka Systems, Inc., product name: "MM5200").

[Measurement of Dichroic Ratio]

Measuring light of linear polarization in the range at a wavelength of 380 to 780 nm was allowed to enter using a spectrophotometer with Glan-Thompson polarizer (produced by JASCO Corporation, product name: U-4100) to obtain averages $k_1$ and $k_2$ of the aforementioned wavelength region to calculate the following equation by multiplying a visibility correction factor for each wavelength to be integrated:

$$\text{Dichroic ratio} = \log(1/k_2)/\log(1/k_1) \qquad \text{Equation}$$

wherein $k_1$ is a transmittance of a linear polarization in a maximum transmittance direction and a transmittance $k_2$ is a transmittance of a linear polarization in a direction that is perpendicular to the maximum transmittance direction.

[Measurement of Haze]

Haze was measured at room temperature (23° C.) using a haze meter (produced by MURAKAMI COLOR RESEARCH LABORATORY, product name: HR-100). A mean value of three repeated frequency was taken as a measuring value.

There have thus been shown and described a novel liquid-crystalline coating fluid, and a novel polarizing film, which fulfill all the objects and advantages sought therefor. Many changes, modifications, variations, combinations and other uses and applications of the subject invention will, however, become apparent to those skilled in the art after considering this specification and the accompanying drawings which disclose the preferred embodiments thereof. All such changes, modifications, variations and other uses and applications which do not depart from the spirit or scope of the invention are deemed to be covered by the invention, which is to be limited only by the claims which follow.

What is claimed is:

1. A liquid-crystalline coating fluid comprising:
    a lyotropic liquid crystal compound;
    a vinyl alcohol-based polymer; and
    a solvent,
wherein the weight parts of the vinyl alcohol-based polymer are 0.05 to 1.5 with respect to 100 weight parts of the lyotropic liquid crystal compound.

2. The liquid-crystalline coating fluid according to claim 1, wherein the lyotropic liquid crystal compound is represented by general formula (1):

(1)

wherein R is a hydrogen atom, an alkyl group with 1 to 3 carbon atoms, an acetyl group, a benzoyl group or a phenyl group, wherein these groups have substituent groups, X is a hydrogen atom, a halogen atom, a nitro group, an amino group, a hydroxyl group, an alkoxy group with 1 to 4 carbon atoms, a sulfonic acid group or a sulfonate group, k is an integer from 0 to 4, l is an integer from 0 to 4 (k+l≦4), m is an integer from 0 to 2, and o is an integer from 0 to 2, at least one of k, l, m, and o is not 0, and M represents a counter ion.

3. A polarizing film obtained by casting the liquid-crystalline coating fluid according to claim 1 or claim 2 in a thin film state, followed by drying.

* * * * *